(12) United States Patent
Hennion

(10) Patent No.: US 11,148,399 B2
(45) Date of Patent: Oct. 19, 2021

(54) LAMINATED GLASS IN WHICH A SINGLE GLASS SHEET HAS A THROUGH-HOLE

(71) Applicant: SAINT-GOBAIN GLASS FRANCE, Courbevoie (FR)

(72) Inventor: Alexandre Hennion, Trie Château (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 116 days.

(21) Appl. No.: 16/481,175

(22) PCT Filed: Feb. 1, 2018

(86) PCT No.: PCT/FR2018/050240
§ 371 (c)(1),
(2) Date: Jul. 26, 2019

(87) PCT Pub. No.: WO2018/142078
PCT Pub. Date: Aug. 9, 2018

(65) Prior Publication Data
US 2019/0389181 A1 Dec. 26, 2019

(30) Foreign Application Priority Data
Feb. 3, 2017 (FR) ...................... 1750929

(51) Int. Cl.
*B32B 17/10* (2006.01)
*B32B 7/12* (2006.01)
*B32B 17/06* (2006.01)

(52) U.S. Cl.
CPC .......... *B32B 17/10293* (2013.01); *B32B 7/12* (2013.01); *B32B 17/061* (2013.01);
(Continued)

(58) Field of Classification Search
CPC ... B32B 7/12; B32B 17/061; B32B 17/10005; B32B 17/10036; B32B 17/10293;
(Continued)

(56) References Cited

U.S. PATENT DOCUMENTS 6,103,999 A  8/2000 Nishio et al.
2006/0292380 A1 12/2006 Mann
(Continued)

FOREIGN PATENT DOCUMENTS

JP  2005-350290 A  12/2005
JP  2006-160598 A   6/2006
(Continued)

OTHER PUBLICATIONS

[NPL-1] Thin Metal Sales, Inc. (Nov. 2, 2009), <https://www.thinmetalsales.com/>. (Year: 2009).*
(Continued)

*Primary Examiner* — David Sample
*Assistant Examiner* — Donald M Flores, Jr.
(74) *Attorney, Agent, or Firm* — Pillsbury Winthrop Shaw Pittman LLP

(57) ABSTRACT

A laminated glazing includes a first sheet of glass and a second sheet of glass which are bonded together via an adhesive interlayer, in which the second sheet of glass has a through-hole, wherein over the surface of the hole and a peripheral surface around same, a thin sheet of a thickness of between 0.01 and 0.5 mm, made from a material compatible with the manufacture and the mechanical stresses and the aging of the laminated glazing, is interposed between the adhesive interlayer and the second sheet of glass.

20 Claims, 1 Drawing Sheet

(52) U.S. Cl.
CPC .. *B32B 17/10005* (2021.01); *B32B 17/10036* (2013.01); *B32B 17/10376* (2013.01); *B32B 17/10761* (2013.01); *B32B 2307/202* (2013.01); *Y10T 428/24273* (2015.01)

(58) Field of Classification Search
CPC ........ B32B 17/10376; B32B 17/10761; B32B 2307/202; Y10T 428/24273
See application file for complete search history.

(56) References Cited

U.S. PATENT DOCUMENTS

2011/0232748 A1* 9/2011 Shimizu .............. H01L 31/0488
    136/256
2015/0236491 A1* 8/2015 Bureloux .......... B32B 17/10376
    174/650

FOREIGN PATENT DOCUMENTS

| WO | WO 2007/057461 A1 | 5/2007 | |
|----|----|----|----|
| WO | WO 2009/001264 A1 | 12/2008 | |
| WO | WO-2009001264 A1 * | 12/2008 | ....... B32B 17/10376 |
| WO | WO 2014/057224 A1 | 4/2014 | |

OTHER PUBLICATIONS

International Search Report as issued in International Patent Application No. PCT/FR2018/050240, dated Jun. 27, 2018.

* cited by examiner

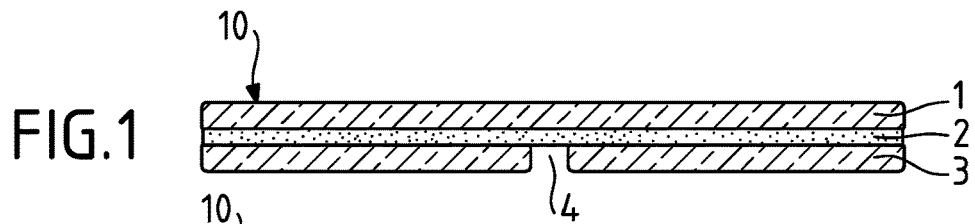
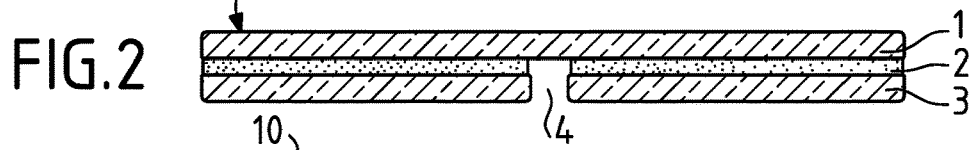
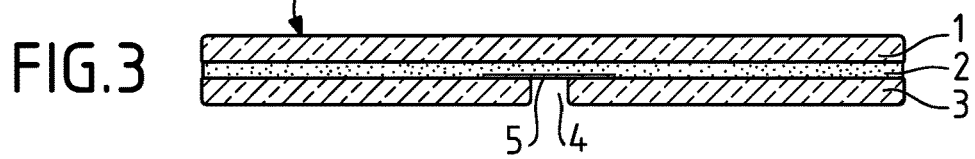
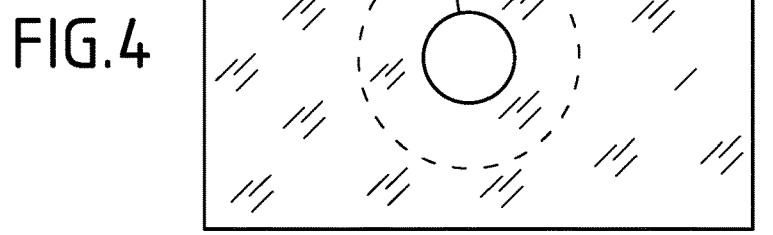
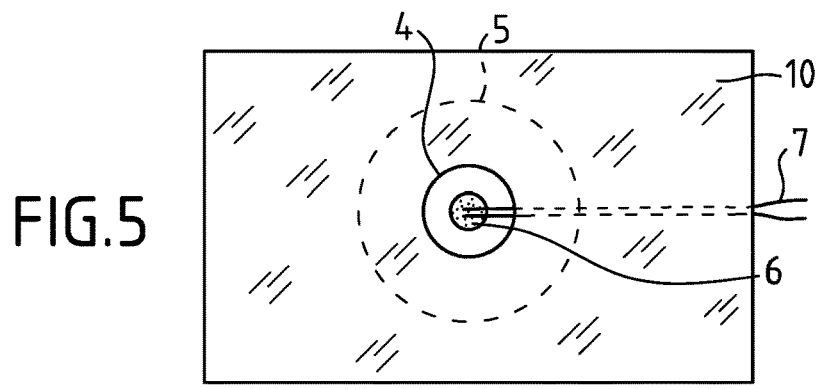
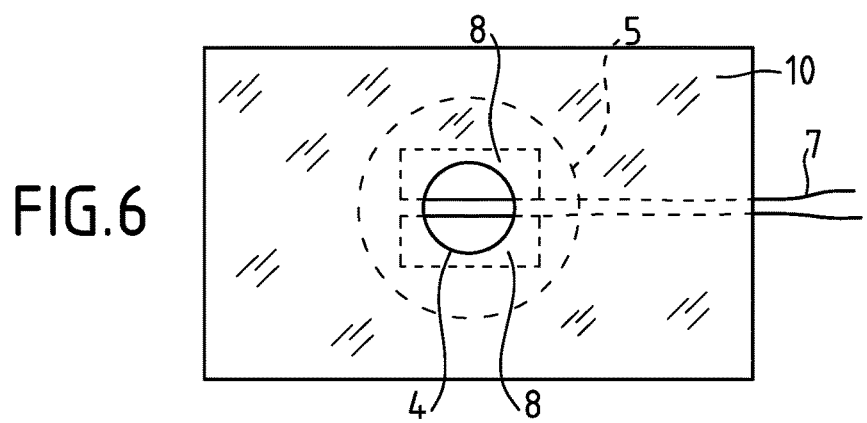

LAMINATED GLASS IN WHICH A SINGLE GLASS SHEET HAS A THROUGH-HOLE

CROSS REFERENCE TO RELATED APPLICATIONS

This application is the U.S. National Stage of PCT/FR2018/050240, filed Feb. 1, 2018, which in turn claims priority to French Patent Application No. 1750929 filed Feb. 3, 2017, the entire contents of all applications are incorporated herein by reference in their entireties.

The present invention relates to laminated glazing in which just one of the constituent sheets of glass has a through-hole.

Laminated glazing comprises at least two sheets of glass bonded together by an adhesive interlayer made for example of polyvinylbutyral.

Just one of these two sheets of glass may have a through-hole: either the adhesive interlayer is then removed at the site of the hole and the safety-related functions are no longer guaranteed (the mechanical properties, as confirmed by "ball drop" tests are insufficient), or the adhesive interlayer is left in position at this location and degrades or creeps during the manufacture of the laminated glazing or at high temperature, and the resistance of the glazing to aging at high temperature and/or at high moisture contents, or as confirmed by a test in which it is brought into contact with an environment with a relative humidity at least equal to 95% at a temperature such as 70° C. for a duration of 7 or even 14 days for example, will be insufficient.

It is an object of the invention to guarantee the integrity of laminated glazing in which one sheet of glass has a through-hole, during its method of manufacture, and to increase its resistance to aging under the most demanding conditions.

This object is achieved by the invention the subject of which accordingly is laminated glazing comprising a first sheet of glass and a second sheet of glass which are bonded together via an adhesive interlayer, in which the second sheet of glass has a through-hole, characterized in that over the surface of the hole and a peripheral surface around same, a thin sheet of a thickness of between 0.01 and 0.5 mm, made from a material compatible with the manufacture and the mechanical stresses and the aging of the laminated glazing is interposed between the adhesive interlayer and the second sheet of glass.

What is essentially meant here by a "sheet of glass" is a sheet of mineral glassmaking material such as, in particular, soda-lime-silica float glass, borosilicate glass, alum inosilicate glass, vitreous ceramic glass, but also organic glassmaking material such as polycarbonate, poly(methyl methacrylate), ionomer resin.

The adhesive interlayer is essentially made up of polyvinylbutyral, ethylene-vinyl acetate copolymer or thermoplastic polyurethane.

By virtue of the invention, the thin sheet hermetically seals the hole: lamination is guaranteed and the mechanical properties as confirmed by ball drop tests are improved. The ability to withstand aging at high temperature and relative humidity is good.

According to preferred features of the laminated glazing of the invention:

the thin sheet comprises a mineral glassmaking material such as glass or vitreous ceramic and/or a polymer material such as polycarbonate, poly(methyl methacrylate) and/or a corrosion-resistant metal such as aluminum and/or a composite material such as carbon, in particular in the form of fibers; a metal may refer to a metal alloy; it may be opaque, reflective, electrically conducting in which case insulation needs to be applied between the two tracks;

the thin sheet has a hole;

in this alternative form, the adhesive interlayer comprises electrically conducting wires which pass through the hole in the thin sheet, or alternatively the adhesive interlayer comprises electrically conducting wires which are connected to a flat connector positioned on the face of the adhesive interlayer facing toward the second sheet of glass, so as to be accessible from the outside of the laminated glazing via the hole in the thin sheet;

in another alternative form, the face of the thin sheet that faces toward the second sheet of glass bears a flat connector connected to an electrically conducting layer or electrically conducting wires positioned on the face of the second sheet of glass that faces toward the adhesive interlayer;

the thin sheet is opaque in its thickness or as a result of treatment of at least one of its faces, or alternatively, the face of the thin sheet that faces toward the second sheet of glass is reflective; these measures are aimed for example at avoiding the spots of light which are visible from the opposite side of the laminated glazing to the thin sheet (in particular from the outside of the vehicle equipped with this glazing) if the optical density of the black enamel is not high enough to mask the light source installed in the through-hole in the second sheet of glass.

Further subjects of the invention are a first method for the manufacture of laminated glazing described hereinabove, characterized in that the thin sheet is attached to the adhesive interlayer by local heating, then a method for assembling the laminated glazing is implemented;

a second method for the manufacture of laminated glazing as described hereinabove, characterized in that the thin sheet is attached to the second sheet of glass by means of adhesive or a double-sided adhesive tape, then a method for assembling the laminated glazing is implemented;

a third method for the manufacture of laminated glazing as described hereinabove, characterized in that the constituent components of the laminated glazing are superposed, and then a method for assembling the laminated glazing is implemented.

In implementing each one of these three methods the adhesive interlayer may advantageously be stretched locally in that fraction of its surface that is intended to be in contact with the thin sheet.

And finally, further subjects of the invention involve the application of laminated glazing as described hereinabove to incorporating an element connected to an electrical power supply, such as for lighting, satellite geolocation-navigation, as a single or double (stereoscopic) camera; and the application of laminated glazing as described hereinabove to incorporating an element that has no electrical connections.

The invention will be better understood in the light of the following description of the attached schematic depictions of laminated glazing, in which just one of the sheets of glass has a through-hole, in which:

FIGS. 1 and 2 are views in cross section of glazing implementing known solutions;

FIG. 3 is a view in cross section of glazing according to the invention;

FIG. 4 is a face-on view of standard glazing according to the invention, and

FIGS. 5 and 6 are face-on views of two alternative forms of glazing according to the invention incorporating electrical connections.

With reference to FIGS. 1 and 2, laminated glazing 10 is made up of a first sheet of glass 1 and of a second sheet of glass 3 which are bonded together by an adhesive interlayer 2 of polyvinylbutyral (PVB). Only the second sheet of glass 3 has a through-hole 4.

According to a first route (FIG. 1), the PVB is left in position at the site of the through-hole 4, but there is then a risk of this PVB creeping at high temperature, and there is a risk that the glazing will degrade significantly at high temperature, high relative humidity, and not pass the aging tests, for example at a temperature such as 70° C. and a relative humidity of at least 95% for 7 days, or even 14 days, possibly in the presence of a salt mist or the like.

According to a second route (FIG. 2), the PVB is removed at the site of the through-hole 4, but then the safety-related functions of the laminated glazing are no longer guaranteed, its mechanical properties are insufficient and the glazing no longer passes the ball drop type tests for example.

With reference to FIG. 3, a sheet of glass 5 of a thickness of 0.15 mm is interposed at the site of the through-hole 4 in the second sheet of glass 3, between the latter 3 and the layer of PVB 2, according to the invention.

The thin sheet of glass 5 may be simply stacked with the other constituent components of the laminated glazing and then a conventional method for the manufacture of laminated glazing: outgassing, autoclaving, etc., can be implemented.

The thin sheet of glass 5 may be attached to the layer of PVB 2 beforehand by local heating or alternatively attached to the second sheet of glass 3 by means of adhesive or a double-sided adhesive tape.

Furthermore, local stretching of the adhesive interlayer in that fraction of its surface that is intended to be in contact with the thin sheet may advantageously be carried out. This measure makes it possible to compensate for/eliminate the additional thickness created by the addition of the thin sheet 5 of glass.

The laminated glazing 10 of FIG. 3 exhibits the required mechanical properties, as well as being resistant to aging even at high temperature in a humid environment as mentioned hereinabove, or exposed to various chemical compounds, salts, hydrocarbons, acids, etc.

Three alternative forms of the laminated glazing 10 of FIG. 3 are depicted in a face-on view in FIGS. 4 to 6.

In each of these figures, the thin sheet of glass 5 has the geometry of a disk as does the through-hole 4 in the second sheet of glass 3, the two disks 5, 4 being depicted as concentric.

In FIG. 5, the thin sheet of glass 5 has a hole 6 in the shape of a disk which is likewise concentric and of a diameter that is small in comparison with that of the through-hole 4.

Electrically conducting wires 7, depicted schematically, are embedded in the adhesive interlayer 2 and connected to an electrical power supply of the bus bars or equivalent type, in the laminated structure of the glazing 10. Electrically conducting wires 7 emerge through the hole 6 so that they can be connected to an electronic element, lighting, etc.

One alternative form of this laminated glazing 10 of FIG. 5 may differ therefrom in that the electrically conducting wires 7 are connected to a flat connector, not depicted, positioned on the face of the layer of PVB 2 that faces toward the second sheet of glass 3, at the hole 6 in the thin sheet of glass 5. The flat connector is then accessible from outside the laminated glazing 10 via the hole 6 in the thin sheet of glass 5, for example in order to afford an electrical power supply to an electronic element, lighting (not depicted) by means of a connector by contact for example, of the type known in batteries with contact blades in particular.

With reference to FIG. 6, a flat connector 8 may also be bonded or applied in the form of a thin layer onto the face of the thin sheet of glass 5 that faces towards the second sheet of glass 3. The thin sheet of glass 5 here does not have a hole 6. The flat connector 8 is accessible from outside the laminated glazing 10 via the hole 4 in the second sheet of glass 3, for example in order to afford an electrical power supply to an electronic element, lighting (not depicted) by means of a contact connector for example as already mentioned hereinabove.

In this embodiment, the flat connector 8 may be connected to electrically conducting wires 7 embedded in the layer of PVB 2, or alternatively to an electrically conducting layer on the face of the second sheet of glass 3 that faces toward the layer of PVB 2, the electrically conducting wires 7 or the electrically conducting layer being themselves in each instance connected to an electrical power supply.

The invention claimed is:

1. A laminated glazing comprising a first sheet of glass and a second sheet of glass which are bonded together via an adhesive interlayer, in which the second sheet of glass has a through-hole, wherein over a surface of the through-hole and a peripheral surface around the through-hole, a thin sheet of a thickness of between 0.01 and 0.5 mm, made from a material compatible with the manufacture and the mechanical stresses and the aging of the laminated glazing, is interposed between the adhesive interlayer and the second sheet of glass, wherein the thin sheet comprises a mineral glassmaking material and/or a polymer material and/or a composite material.

2. The laminated glazing as claimed in claim 1, wherein the thin sheet has a hole.

3. The laminated glazing as claimed in claim 2, wherein the adhesive interlayer comprises electrically conducting wires which pass through the hole in the thin sheet.

4. The laminated glazing as claimed in claim 1, wherein the thin sheet is opaque in its thickness or as a result of treatment of at least one of its faces.

5. The laminated glazing as claimed in claim 1, wherein a face of the thin sheet that faces toward the second sheet of glass is reflective.

6. The laminated glazing as claimed in claim 1, wherein the mineral glassmaking material is as glass or vitreous ceramic, the polymer material is polycarbonate, poly(methyl methacrylate) and the composite material is carbon in the form of fibers.

7. A laminated glazing comprising a first sheet of glass and a second sheet of glass which are bonded together via an adhesive interlayer, in which the second sheet of glass has a through-hole, wherein over a surface of the through-hole and a peripheral surface around the through-hole, a thin sheet of a thickness of between 0.01 and 0.5 mm, made from a material compatible with the manufacture and the mechanical stresses and the aging of the laminated glazing, is interposed between the adhesive interlayer and the second sheet of glass, wherein the adhesive interlayer comprises electrically conducting wires which pass through the hole in the thin sheet and wherein the adhesive interlayer comprises electrically conducting wires which are connected to a flat connector positioned on a face of the adhesive interlayer facing toward the second sheet of glass, so as to be accessible from the outside of the laminated glazing via the hole in the thin sheet.

8. The laminated glazing as claimed in claim 7, wherein the thin sheet has a hole.

9. The laminated glazing as claimed in claim 7, wherein the adhesive interlayer comprises electrically conducting wires which pass through the hole in the thin sheet.

10. The laminated glazing as claimed in claim 7, wherein the thin sheet is opaque in its thickness or as a result of treatment of at least one of its faces.

11. A laminated glazing comprising a first sheet of glass and a second sheet of glass which are bonded together via an adhesive interlayer, in which the second sheet of glass has a through-hole, wherein over a surface of the through-hole and a peripheral surface around the through-hole, a thin sheet of a thickness of between 0.01 and 0.5 mm, made from a material compatible with the manufacture and the mechanical stresses and the aging of the laminated glazing, is interposed between the adhesive interlayer and the second sheet of glass, wherein a face of the thin sheet that faces toward the second sheet of glass bears a flat connector connected to an electrically conducting layer or electrically conducting wires positioned on a face of the second sheet of glass that faces toward the adhesive interlayer.

12. The laminated glazing as claimed in claim 11, wherein the thin sheet has a hole.

13. The laminated glazing as claimed in claim 11, wherein the adhesive interlayer comprises electrically conducting wires which pass through the hole in the thin sheet.

14. The laminated glazing as claimed in claim 11, wherein the thin sheet is opaque in its thickness or as a result of treatment of at least one of its faces.

15. A method for the manufacture of laminated glazing as claimed in claim 1, comprising attaching the thin sheet to the adhesive interlayer by local heating, then assembling the laminated glazing.

16. A method for the manufacture of laminated glazing as claimed in claim 1, comprising attaching the thin sheet to the second sheet of glass by means of adhesive or a double-sided adhesive tape, then assembling the laminated glazing.

17. A method for the manufacture of laminated glazing as claimed in claim 1, comprising superposing the constituent components of the laminated glazing, and then a assembling the laminated glazing.

18. The method as claimed in claim 15, further comprising locally stretching the adhesive interlayer in the fraction of its surface that is intended to be in contact with the thin sheet.

19. A method comprising utilizing a laminated glazing as claimed in claim 1 to incorporate an element connected to an electrical power supply.

20. A method comprising utilizing a laminated glazing as claimed in claim 1 to incorporate an element without electrical connections.

* * * * *